United States Patent [19]
Wu et al.

[11] Patent Number: 6,148,268
[45] Date of Patent: Nov. 14, 2000

[54] METHOD FOR QUALITY CONTROL AND YIELD ENHANCEMENT

[76] Inventors: Yongan Wu, 272 Cambridge Rd., Apt. #3, Woburn, Mass. 01801; Constance J. Chang-Hasnain, 4387 Remora Dr., Union City, Calif. 94587

[21] Appl. No.: 09/088,957

[22] Filed: Jun. 2, 1998

Related U.S. Application Data

[60] Provisional application No. 60/047,362, Jun. 2, 1997.

[51] Int. Cl.[7] ........................................ G06F 15/00
[52] U.S. Cl. .............................. 702/84; 702/180; 702/181; 702/182
[58] Field of Search ......................... 702/81, 84, 179–182; 324/719, 722; 700/109, 116

[56] References Cited

U.S. PATENT DOCUMENTS

| | | | |
|---|---|---|---|
| 5,134,574 | 7/1992 | Beaverstock et al. | 702/84 |
| 5,585,734 | 12/1996 | Meuris et al. | 324/719 |
| 5,661,696 | 8/1997 | Kimball et al. | 702/11 |
| 5,715,181 | 2/1998 | Horst | 702/81 |
| 5,991,703 | 11/1999 | Kase | 702/167 |
| 6,013,533 | 1/2000 | Sugasawara et al. | 438/10 |

*Primary Examiner*—Marc S. Hoff
*Assistant Examiner*—Bryan Bui
*Attorney, Agent, or Firm*—Lumen Intellectual Property Services

[57] ABSTRACT

An efficient method for optimization of product characteristics or manufacturing processes. The method utilized a Chi-square model to identify error sources that contribute to the product or process variability. The method is particularly useful for evaluation of processes related to optics and electronics fabrication but also has application in fields where a chi-square distribution is observed.

12 Claims, 8 Drawing Sheets

Characteristic Gaussian Distribution

Fig. 2a

Characteristic Chi-square Distribution

κ≈3, and ω≈10

*Fig. 5a*

κ≈2, and ω≈10

*Fig. 5b*

$\kappa = 1.9$, and $\omega = 9.7$

*Fig. 5c*

$\kappa = 2$, and $\omega = 1$

METHOD FOR QUALITY CONTROL AND YIELD ENHANCEMENT

RELATED APPLICATIONS

This application claims priority from U.S. provisional application 60/047,362 filed Jun. 2, 1997, which is herein incorporated by reference.

This invention was developed with government support supplied by the Joint Services Electronics Program no. N00012-89-K0067. The government has certain rights to this invention.

FIELD OF THE INVENTION

This invention relates generally to methods for assessment and optimization of controllable processes through evaluation and adjustment of processes parameters.

BACKGROUND

The ability to understand and predict product performance is important to all manufacturers but especially manufacturers of electronic and optical devices where a high level of product consistency and performance is required. Identification of the errors that reduce product performance is usually done at considerable cost through design experiments or a Taguchi analysis (for details, see Taguchi Methods, Glen Stuart Peace, Addison-Wesley publishing Company, In 1992). Integrated circuit and laser fabrication processes often operate at near optimum conditions. Under such conditions non-Gaussian distributions are often observed for variable processes or product characteristics.

In the conditions where the process is operating at near optimum conditions a Chi-square analysis is appropriate. A method for assessing the contributions to the variability and an avenue to eliminating them is required to optimize a product characteristic or manufacturing process.

OBJECTS AND ADVANTAGES

Accordingly, it is a primary object of the present invention to provide a method for analyzing the elements that contribute to the variations in a product characteristic or a manufacturing process. Through modeling, fabrication processes can be optimized and lead to consistent and enhanced product performance and product yield.

SUMMARY

These objectives and advantages are attained by selecting a predetermined number of the products to study. The product can be any material on which an operation has been performed to generate a product characteristic. For example, the product could be pieces of metal that are cut to specified dimension in a knifing operation. Secondly, measure the parameter for each product to obtain a parameter distribution. In the example of the knifing operation, the parameter measured would be the dimensions of the pieces of cut metal. The number of repeated measurements should be sufficient to generate a reproducible distribution curve for the product parameter. The data collected from the repeated measurements of the product characteristic are then plotted in a histogram and the curvature is modeled to a Chi-square function. Applying the Chi-square curve fit to the non-Gaussian distribution will generate values of $\kappa$, $\omega$ and $Q_0$. The following physical significance is given to these terms.

The term $\kappa$ denotes the number of independent sources contributing to variability of a process or product characteristic. The term $\omega$ denotes the distribution of the variability of a process or product characteristic and $Q_0$ signifies the optimized value for the measured characteristic. Possible error sources that contribute to $\kappa$ and $\omega$ are identified and reduced or eliminated. The optimization process is repeated beginning with the data collection step for the same product characteristic until all possible sources of error have been reduced or eliminated as indicated by small constant $\kappa$ value(s) and reduced $\omega$ value(s).

The optimization procedure disclosed in this invention can equally be applied to a manufacturing operation. In the example of the knifing operation, a micrometer can be attached to the cutting knife and a measure of the knife's position could be measured during each cutting operation. The subsequent analysis to achieve optimization of this manufacturing operation would be identical to that discussed for product characteristics. It is also duly noted that the curvature of the distribution curves could be modeled by a Gamma function or any other function that is mathematically equivalent to the Chi-square function.

The method of identifying error sources in a product characteristic or process parameter involves a microprocessor as an element of the method. A simplified system consists of a microprocessor and display device. The method involves selecting a predetermined number of a product and measuring a parameter for each of the products to obtain a parameter data set. The parameter data set is entered into a micro-processor with appropriate software applications either manually or automatically. The micro-processor can relate said parameter data set to a Chi-square function thereby generating values for $\kappa$ and $\omega$. Values for $\kappa$ and $\omega$ are displayed on a device connected to the micro-processor.

The method could be automated to provide continual monitoring of a process. As in previous examples, identification of error sources contributing to $\kappa$ and $\omega$ and eliminating these sources through iterative Chi-squared analysis will optimize the process.

Additionally, the method claimed can be used to predict how a product characteristic or manufacturing process will change if a step within that process is altered or changed.

DESCRIPTION OF THE FIGURES

FIGS. 1(a–b) illustrate flow charts outlining the steps of the method.

FIGS. 5(a–d) are graphs showing the changes in the Chi-square function as the error sources are eliminated.

FIG. 6 illustrates the laminating operation that the Chi-square analysis is applied to.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Theory-Model

The model presented, herein, provides a method of assessing the measured variability in a process or a product characteristic called the quantity Q. The model gives physical significance to the mathematical terms that constitute variations for a measurable quantity Q and provides a technique to limit the sources of variation.

A measurable quantity Q that varies as a result of a set of independent variables comprised of $y_1, y_2, y_3, \ldots y_n$ is a function of these variables, $Q=f(y_1, y_2, y_3 \ldots y_n)$. For the simplified case, with only one variable, Q can be described by the Taylor Expansion:

$$Q=Q_0+\Delta Q=Q_0+f'(y_0)(y-y_0)+\tfrac{1}{2}f''(y_0)(y-y_0)^2+ \ldots$$

The data collected for a set of iterative measurements of Q can be plotted in a Cartesian coordinate system to generate a distribution curve. Where statistical errors are the causes of the variations observed in Q, there are three distribution curve shapes that can be generated.

In the first case the variation ($\Delta Q$) in the quantity Q is dominated by the first order terms of the Taylor Expansion $f'(y_0)(y-y_0)$. In this case, the distribution curve generated from a set of iterative measurements of Q is modeled by the Gaussian function.

In a second case, the variations ($\Delta Q$) in the quantity Q are dominated by the second order terms of the Taylor Expansion $$\frac{1}{2}f''(y_0)(y-y_0)^2.$$

This occurs when the processes contributing to the variations of the quantity Q are operating near optimum and therefore $Q \cong Q_0$; this is the most common condition for laser and integrated circuit fabrication processes. In this case the distribution curve generated from a set of iterative measurements of Q is described by the Chi-square function:

$$P(Q) = \chi_1^2(q) = \frac{1}{\sqrt{2\pi\omega}} \frac{1}{\sqrt{q}} e^{-q/2}$$

where $$q=(Q-Q_0)/\omega$$

and $$\omega=\tfrac{1}{2}f''(y_0)\cdot\sigma_y^2.$$

The Chi-square function above describes the condition where there is one degree of freedom. The more general form of the equation where there are κ degrees of freedom is:

$$P(Q) = \chi_1^2(q) = \frac{1}{\sqrt{2^\kappa\omega} \cdot \Gamma(\kappa/2)} q^{\kappa/2-1} e^{-q/2}$$

In a third case the variations ($\Delta Q$) in the quantity Q are significantly influenced by first and second order terms, $$\left[f'(y_0)(y-y_0) \cong \frac{1}{2}f''(y_0)(y-y_0)^2\right],$$

in the Taylor Expansion. In this case the distribution curve for the measured quantity Q generated from a set of iterative measurements of Q is described as the sum of a Gaussian and Chi-squared distribution.

In the three distribution curves described, there are factors contributing to variability of a process or product characteristic that can be reduced or eliminated according to the invention.

Figure 1A:
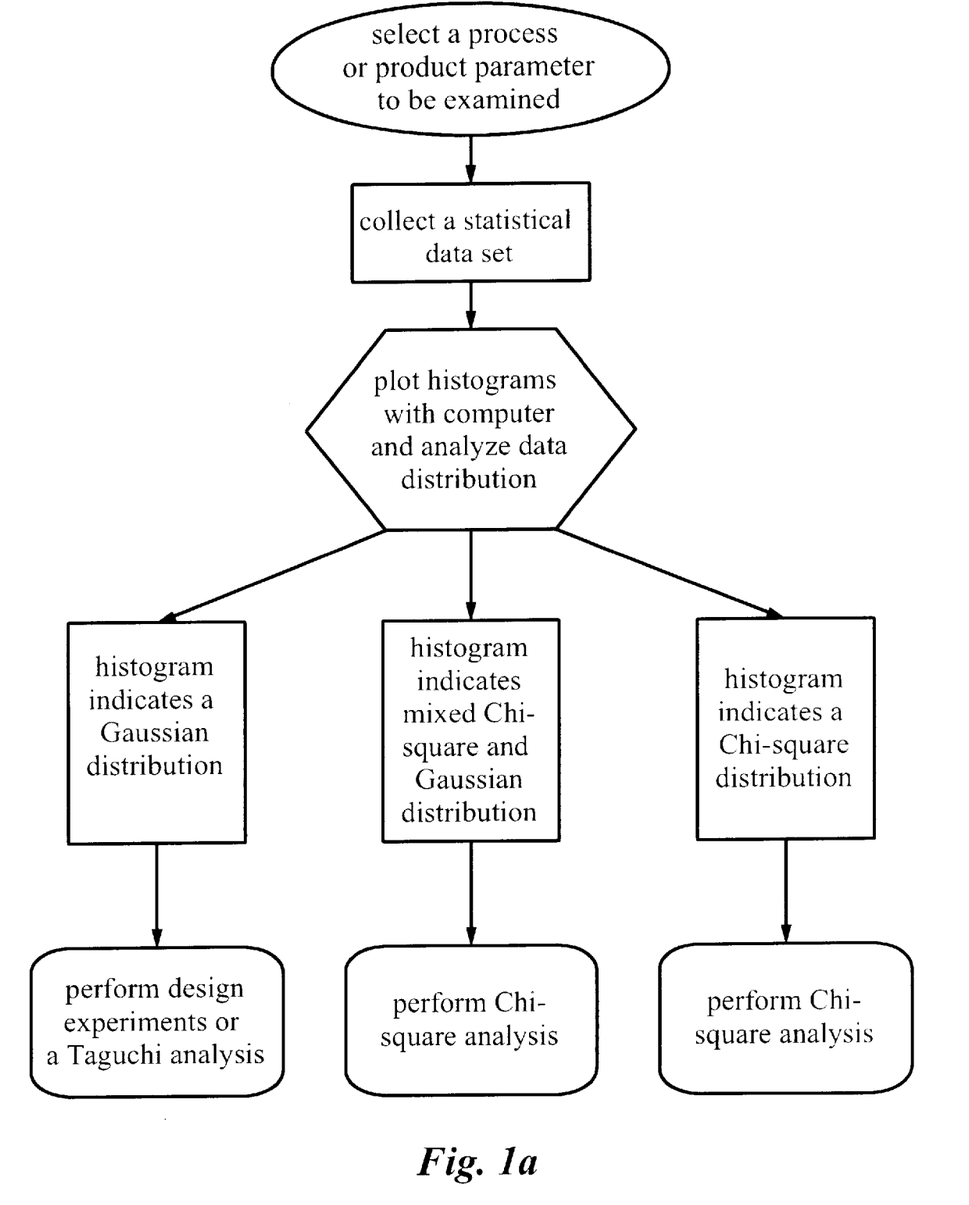
Figure 2A:
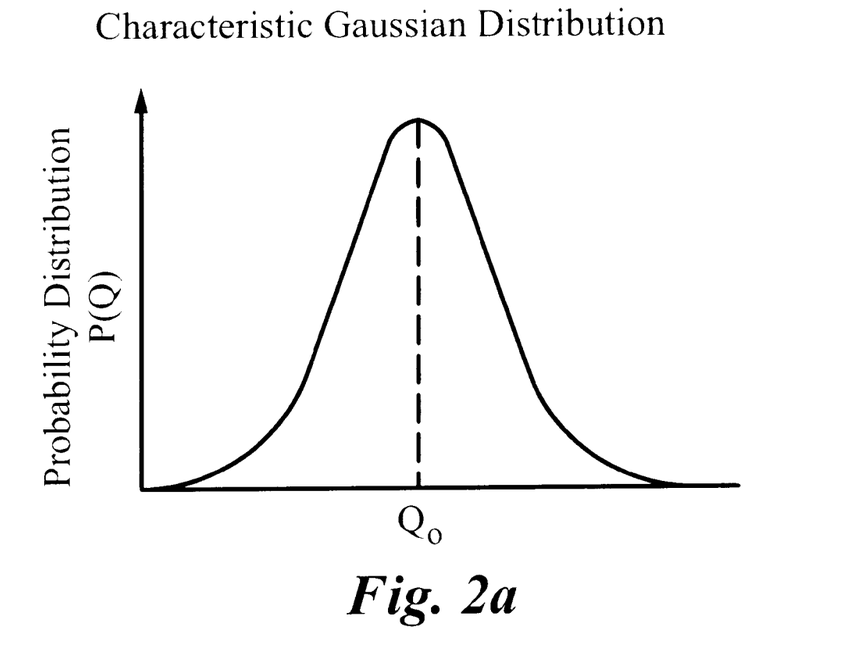
FIG. 2 are graphs of Gaussian and Chi-square functions.
Figure 2B:
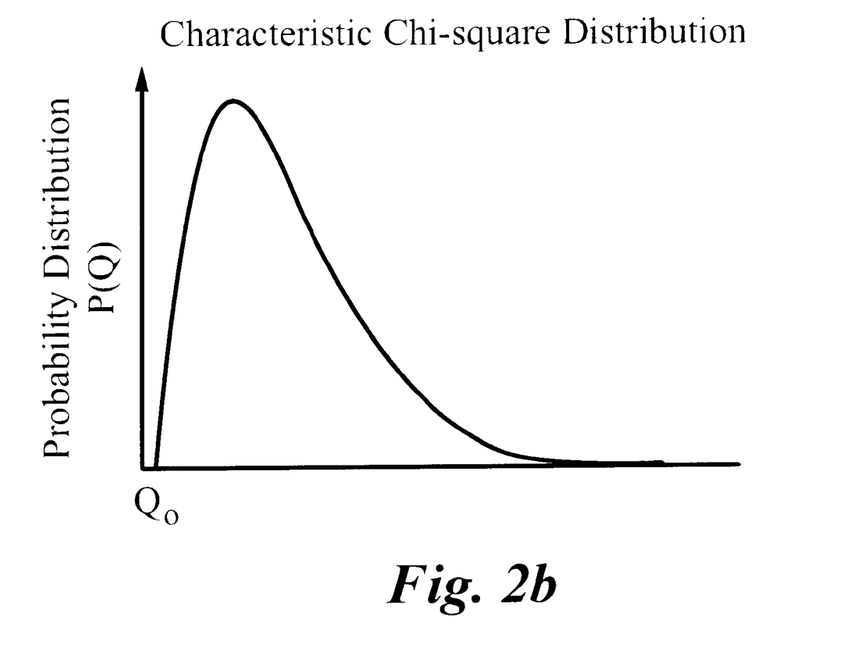

FIG. 1(a) contains a flow chart outlining the first steps of the optimization process disclosed in this invention. Firstly a process or product parameter is selected for evaluation. The parameter is measured repeatedly and a statistical data set is collected. The data is plotted in a histogram format with a standard computer plotting program. The curvature of the histogram is examined for a characteristic Gaussian distribution or Chi-square distribution shape. FIG. 2 reveals the distinction between the Chi-square distribution and the Gaussian distribution. If the curvature of the histogram is Gaussian, further optimization of the process can be achieved by performing a design experiment or a Taguchi analysis. If the curvature of the histogram is characteristic of the Chi-square function, the distribution curve can be modeled with the Chi-square function, presented herein, using a computer modeling program.

Figure 1B:
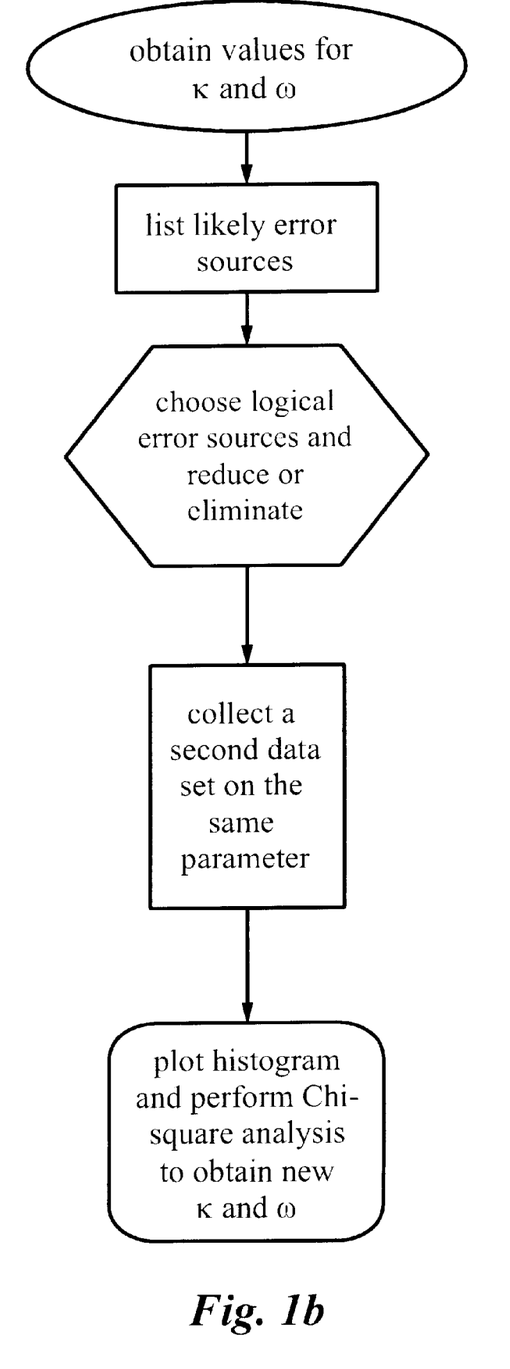

The rest of the optimization process disclosed in this invention is schematically outlined in FIG. 1(b). Once it has been determined that the Chi-square analysis is appropriate, fitting the data to the Chi-square function will generate values for κ and ω. From a list of possible sources of error, logical choices should be made to reduce or eliminate the most likely sources of error. Intuitive judgements are required to choose the most likely source, based on a knowledge of the process and product. The error source may be eliminated by controlling the source to have a particular value. Controllers for controlling process variables are known in the art. Once an error source is reduced or eliminated the process is repeated. Ultimately, the iterative process will result in the reduction of κ and ω to small constant values. Alternatively, the optimization process can be concluded when the product characteristic or manufacturing operation is within design requirements.

Figure 3:
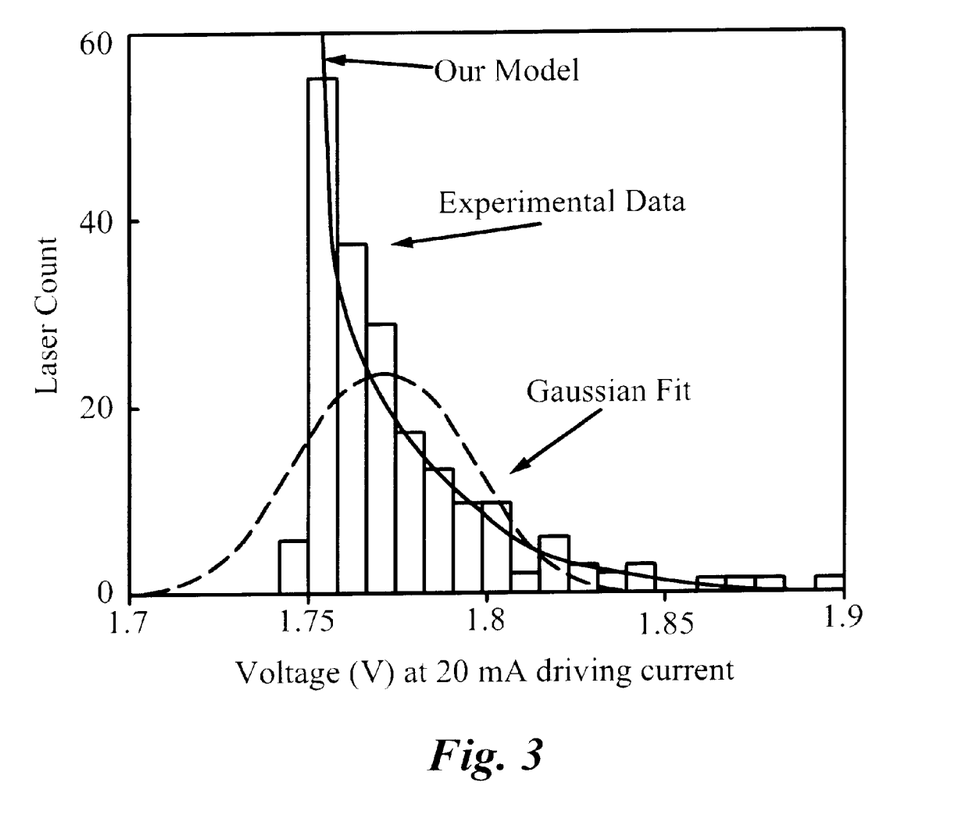
FIG. 3 are graphs illustrating the Chi-square model applied to the operating voltages for 170 vertical cavity surface emitting lasers (VCSELs).
Figure 4:
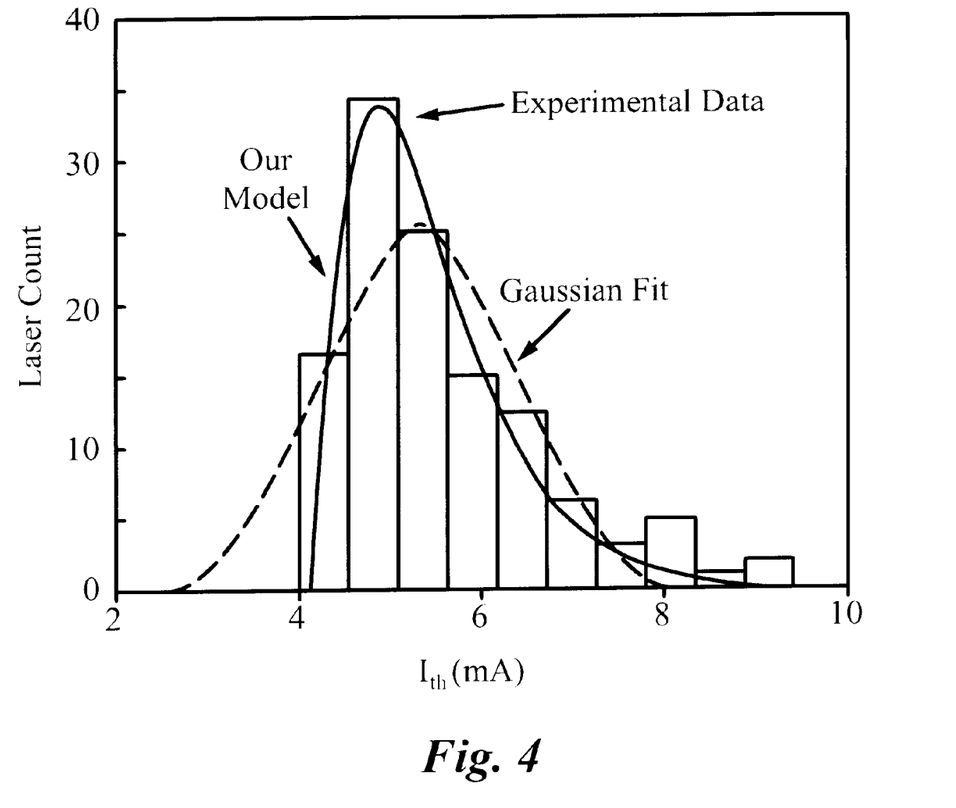
FIG. 4 are graphs illustrating the Chi-square model applied to the threshold current for 120 vertical cavity surface emitting lasers (VCSELs).

FIGS. 3 and 4 illustrate the advantage of the Chi-square model over the Gaussian model applied to product characteristics of vertical cavity surface emitting lasers (VCSELs). FIG. 3 shows the histogram of the operating voltage for 170 vertical cavity surface emitting lasers at 20 mA of driving current. The Chi-square function effectively models the data with a κ=1.4. FIG. 4 illustrates a second experiment, where the threshold current for 120 vertical cavity surface emitting lasers was measured. Again, the Chi-square function duplicates the data with a κ=3.8.

Figure 5A:
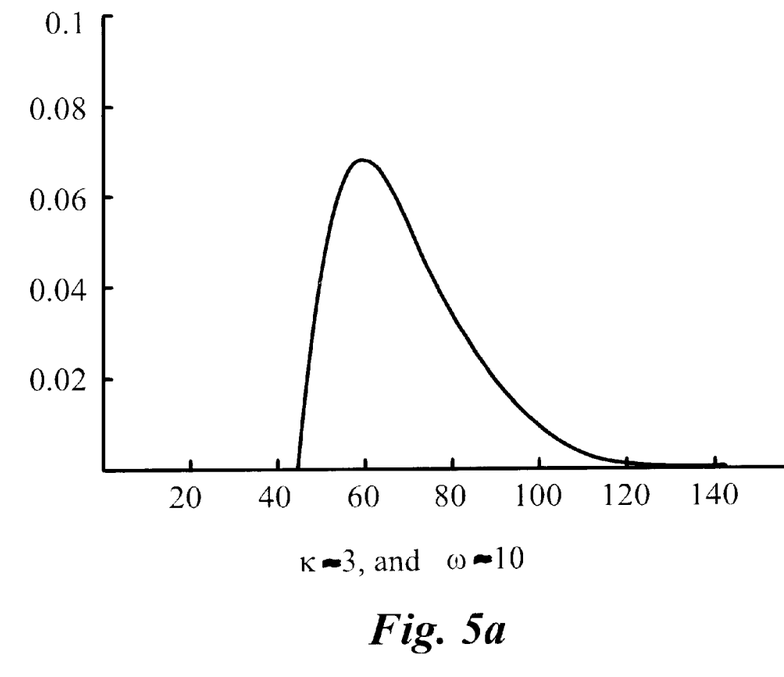
Figure 5B:
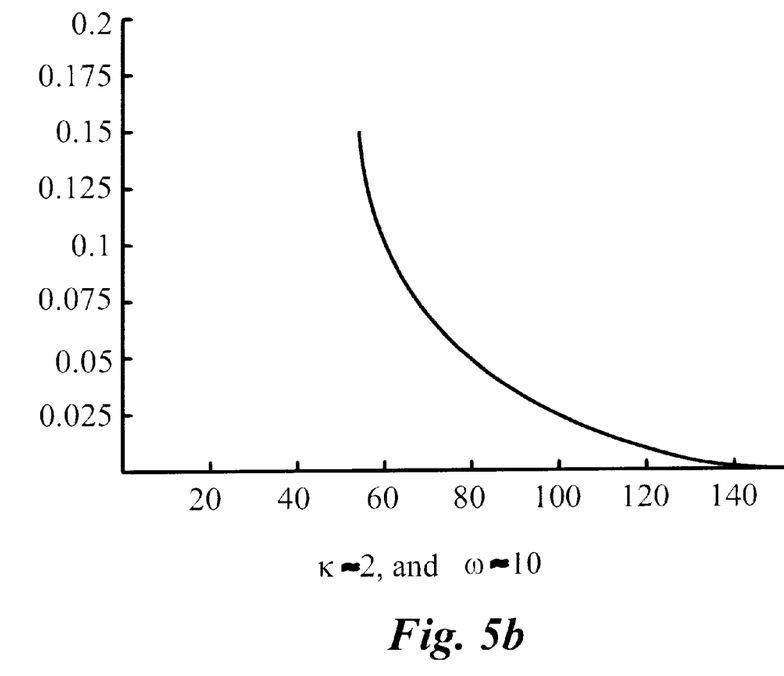
Figure 5C:
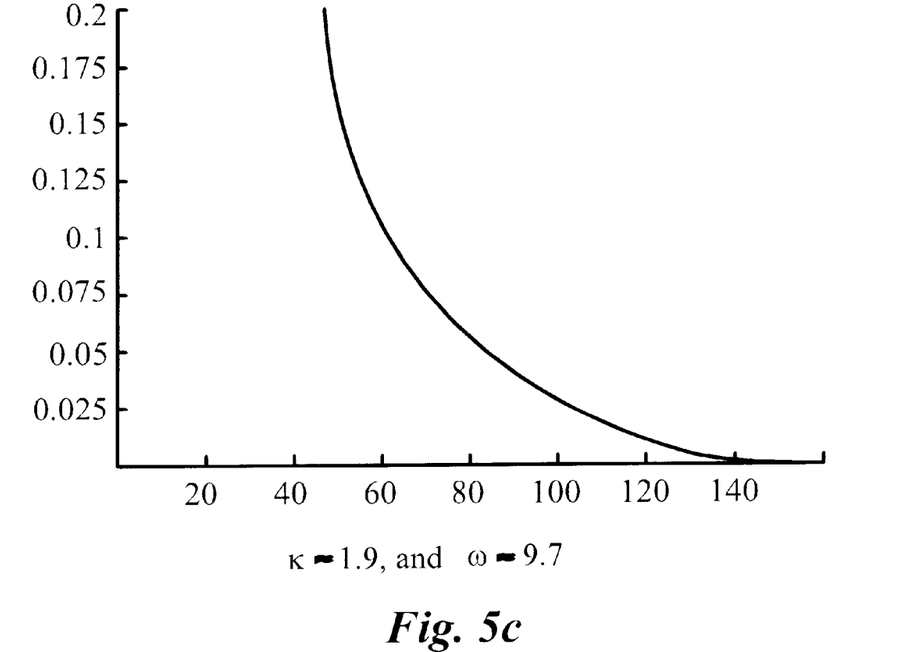
Figure 5D:
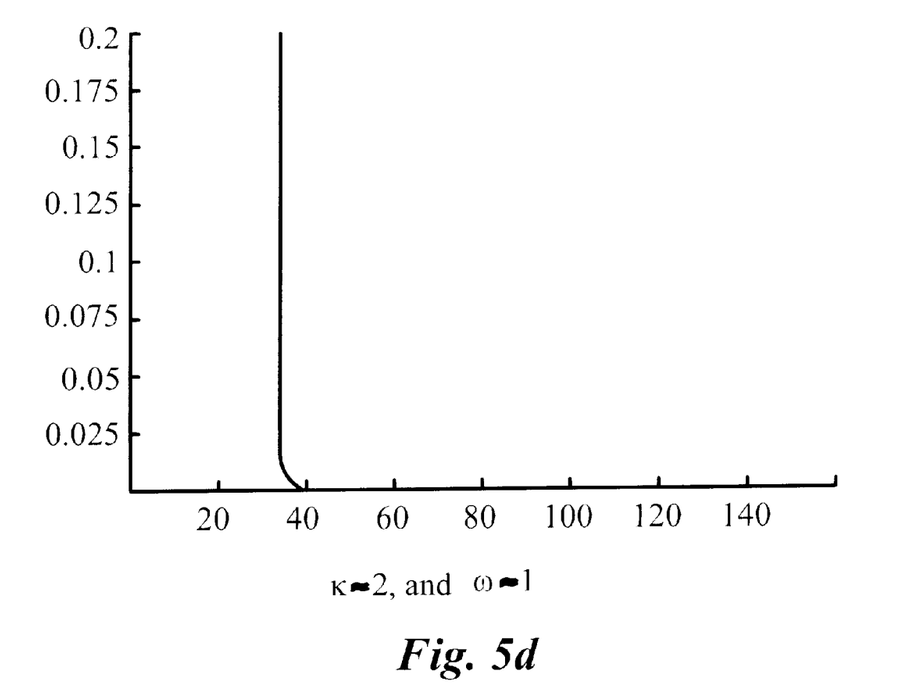

FIGS. 5(a)–(d) show how the Chi-square function will change as the error sources contributing to the variability are corrected. The example is a process or product characteristic that has five potential error sources $q_1$ to $q_5$. The measured parameter in FIG. 5(a) has a κ≈3, and ω≈10 for its Chi-square function. In FIG. 5(b) $q_1$ is controlled. The resultant Chi-square analysis generates values for κ≈2, and ω≈10. This means that $q_1$ is a dominant error sources contributing to the overall variability observed. In FIG. 5(c) $q_2$, $q_3$ and $q_4$ are controlled. The values for κ and ω on this iteration of the method are κ≈1.9, and ω≈9.7 indicating that $q_2$, $q_3$ and $q_4$ are not significant contributors to the overall variability. In FIG. 5(d) error source $q_5$ was controlled and a significant reduction in ω to ≈1 was observed with κ remaining at ≈2. This indicates that the major sources of error are $q_1$ and $q_5$ with a minor contributor from the group $q_2$, $q_3$ and $q_4$. This process has now been optimized.

Laser fabrication is a process where Chi-square distributions are commonly observed for product characteristics such as operating voltage, threshold current, turn-on voltage, break-down voltage, contact resistance, differential resistance and capacitance. Other applications of the invention include: 1) semi-conductor laser fabrication, where threshold current, threshold voltage, operating voltage, operating current, wall plug efficiency, differential efficiency, output power, characteristic temperature, quantum efficiency, internal loss, and diode turn-on voltage and emission spectra are important product characteristics; 2) integrated circuit fabrication, where defect density, noise amplitude, signal to noise ratio, input power, input current, input voltage, output power, output voltage, output current and dark current are important parameters to analyze; 3) transistor manufacturing where gate turn-on voltage, gate leakage current, amplification coefficient, break-down voltage, gate capacitance and resistance are monitored; and 4) optical detector manufacturing, where dark current, detectivity, responsivity, and wavelength spectra are significant parameters to evaluate with the disclosed invention.

Figure 6:
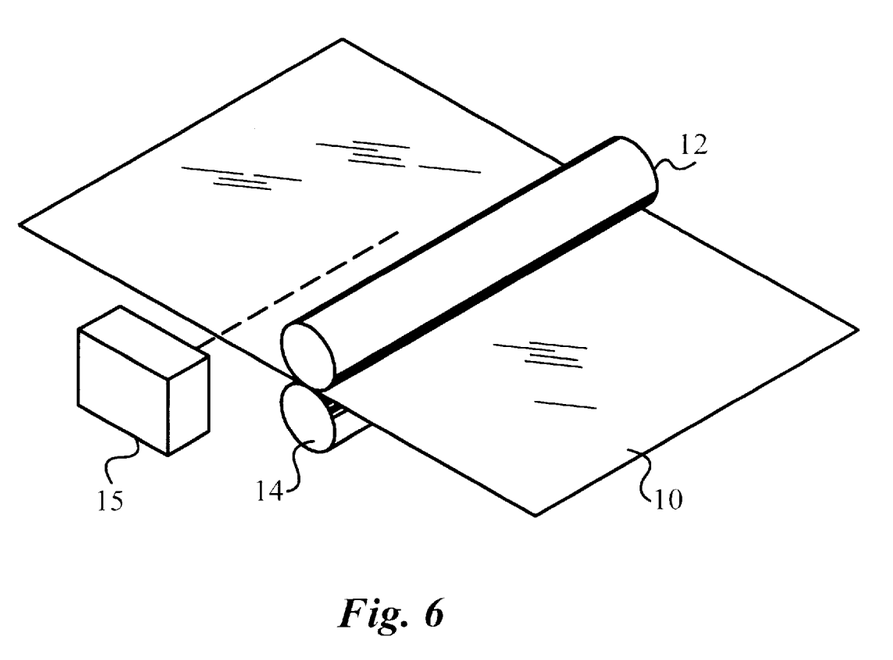

In addition to modeling product parameters the invention is easily extended to evaluating manufacturing operations such as a coating operation viewed in FIG. 6. For example the position of a roller 12 in a coating application for a laminated material could be examined to reduce its variability using the Chi-square analysis. The position of the roller 12 can be monitored with a caliper or micrometer 15 attached to the end of the roller and its position determined for each coating pass of the laminated material 10. A list of potential error sources to the positioning of the roller are roughness of the coated surface, humidity level, temperature and coating speed. A Chi-square analysis where these potential error sources are controlled can reveal error sources that are significant to the process. Reducing the error sources and repeating the Chi-square analysis will optimize the manufacturing operation.

An alternative embodiment to the disclosed invention is using the Chi-square model as a method to predict changes in product characteristics that may occur as a result of a process change. In a coating application for example, a Chi-square analysis concluded that a position of the roller is a significant contributor to the variability of a characteristic for the laminated material; the roller is found to affect the adhesion of the layers. By changing the position of the roller and performing a Chi-square analysis for each position, a function that describes the dependence of the error source number κ and the variance number ω on the roller position is generated. Using the generated function that describes the dependence of the error source number κ and the variance number ω, and plotting a Chi-square distribution for a proposed roller position, the product characteristic of adhesion can be predicted.

It will be clear to one skilled in the art that the above embodiment may be altered in many ways without departing from the scope of the invention. The method may be linked to a software package and microprocessor where the data collection and data analysis are automated, whilst the operations of the method remain the same. Accordingly, the scope of the invention should be determined by the following claims and their legal equivalents.

What is claimed is:

1. A method of optimizing a process affecting a parameter of a product, said method comprising the following steps:

a) selecting a predetermined number of said product;

b) measuring said parameter for each said product to obtain a parameter distribution;

c) fitting said parameter distribution to a Chi-square function having an error source number κ nd a variance number ω;

d) identifying potential error sources contributing to said error source number κ and said variance number ω;

e) eliminating said error sources; and f) repeating steps (b) through (e) until said parameter is within a design requirement.

2. The method of claim 1 wherein, said product is a laser and said parameter is selected from the group consisting of operating voltage, threshold current, turn-on voltage, break-down voltage, contact resistance, differential resistance and capacitance.

3. The method of claim 1 wherein, said product is a semi-conductor laser and said parameter is selected from the group consisting of threshold current, threshold voltage, operating voltage, operating current, wall plug efficiency, differential efficiency, output power, characteristic temperature, quantum efficiency, internal loss, diode turn-on voltage and emission spectra.

4. The method of claim 1 wherein, said product is an integrated circuit and said parameter is selected from the group consisting of defect density, noise amplitude, signal to noise ratio, input power, input current, input voltage, output power, output voltage, output current and dark current.

5. The method of claim 1 wherein, said product is a transistor and said parameter is selected from the group consisting of gate turn-on voltage, gate leakage current, amplification coefficient, break-down voltage, gate capacitance and resistance.

6. The method of claim 1 wherein, said product is an optical detector and said parameter is selected from the group consisting of dark current, detectivity, responsivity, and wavelength spectra.

7. The method of claim 1 wherein, said chi-square function is replaced by an equivalent mathematical expression.

8. A method of optimizing a manufacturing operation, said method comprising the following steps:

a) selecting a predetermined number of said manufacturing operations;

b) measuring a variable parameter for each said manufacturing operation to obtain a parameter distribution;

c) fitting said parameter distribution to a Chi-square function having an error source number κ and a variance number ω;

d) identifying potential error sources contributing to said error source number κ and said variance number ω;

e) eliminating said error sources; and f) repeating steps (b) through (e) until said manufacturing operation is within a design requirement.

9. The method of claim 8 wherein, said chi-square function is replaced by an equivalent mathematical expression.

10. A method of optimizing a process affecting a parameter of a product, said method comprising the following steps:

a) selecting a predetermined number of said product;

b) measuring said parameter for each said product to obtain a parameter data set;

c) inputting said parameter data set into a micro-processor;

d) relating said parameter data set to a Chi-square function through said micro-processor;

e) generating values for an error source number κ and a variance number ω through said micro-processor;

f) connecting said micro-processor to a display device;

g) displaying said values for said error source number κ and said variance number ω on said display device;

h) identifying error sources contributing to said error source number $\kappa$ and said variance number $\omega$;

i) reducing said error sources; and j) repeating steps (b) through (i) until said parameter is within a design requirement.

11. A method of optimizing a manufacturing operation, said method comprising the following steps:

a) selecting a predetermined number of said manufacturing operations;

b) measuring a variable parameter for each said manufacturing operation to obtain a parameter data set;

c) inputting said parameter data set into a micro-processor;

d) relating said parameter data set to a Chi-square function through said micro-processor;

e) generating values for an error source number $\kappa$ and a variance number $\omega$ said micro-processor;

f) connecting said micro-processor to a display device;

g) displaying said values for said error source number $\kappa$ and said variance number $\omega$ on said display device;

h) identifying error sources contributing to said error source number $\kappa$ and said variance number $\omega$;

i) reducing said error sources; and j) repeating steps (b) through (i) until said manufacturing operation is within a design requirement.

12. A method of predicting a product characteristic resulting from a change in a process parameter comprising the following steps:

a) selecting a predetermined number of said product;

b) measuring said product characteristic for each said product to obtain a parameter distribution;

c) fitting said parameter distribution to a Chi-square function having an error source number $\kappa$ and a variance number $\omega$;

d) identifying potential error sources contributing to said error source number $\kappa$ and said variance number $\omega$;

e) changing said process parameter and calculating a dependence of said error source number $\kappa$ and said variance number $\omega$ on said change;

f) generating a Chi-square distribution curve for a proposed change for said process parameter; and g) analyzing said Chi-square distribution to predict said product characteristic.

\* \* \* \* \*